United States Patent
Nguyen et al.

(10) Patent No.: US 6,490,329 B2
(45) Date of Patent: Dec. 3, 2002

(54) DEVICE AND METHOD FOR GENERATING CLOCK SIGNALS FROM A SINGLE REFERENCE FREQUENCY SIGNAL AND FOR SYNCHRONIZING DATA SIGNALS WITH A GENERATED CLOCK

(75) Inventors: Tien Q. Nguyen, San Diego, CA (US); John G. McDonough, La Jolla, CA (US); David (Daching) Chen, Irvine, CA (US); Howard (Hau) Thien Tran, Downey, CA (US)

(73) Assignees: Dot Wireless, Inc., San Diego, CA (US); VSLI Technology, Inc., San Jose, CA (US)

( * ) Notice: Subject to any disclaimer, the term of this patent is extended or adjusted under 35 U.S.C. 154(b) by 0 days.

(21) Appl. No.: 09/905,219

(22) Filed: Jul. 12, 2001

(65) Prior Publication Data

US 2001/0048635 A1 Dec. 6, 2001

Related U.S. Application Data

(62) Division of application No. 09/322,282, filed on May 28, 1999, now Pat. No. 6,289,067.

(51) Int. Cl.$^7$ ............................................. H04L 25/36
(52) U.S. Cl. ........................ 375/372; 375/130; 365/233
(58) Field of Search ............................ 365/233, 189.08, 365/230.05; 375/372, 371, 130

(56) References Cited

U.S. PATENT DOCUMENTS

| | | |
|---|---|---|
| 3,746,847 A | 7/1973 | Maritsas |
| 4,493,046 A | 1/1985 | Watanabe |
| 4,771,426 A | 9/1988 | Rattlingourd et al. |

(List continued on next page.)

OTHER PUBLICATIONS

AK2481 / CDMA / J(N)–TACS / AMPS ABP—Data Sheet, Asahi Kasei Microsystems Co., Ltd., pp. 1–96 (date undetermined).

Primary Examiner—Richard Elms
Assistant Examiner—Hien Nguyen
(74) Attorney, Agent, or Firm—Pedro P. Hernandez; W. James Brady, III; Fredrick J. Telecky, Jr.

(57) ABSTRACT

An integrated circuit device including a FIFO and a clock generator having a pulse swallower. The pulse swallower eliminates pulses from a reference frequency signal, producing a primary digital transceiver clock signal having a frequency of chiprate(S)(n), which is used to clock a digital transceiver when the device is in a primary mode. A first clock divider divides the frequency of the primary digital transceiver clock signal to produce a FIFO output clock signal having a frequency of chiprate(S). The FIFO has a data bus input for coupling to a data output, for example from an analog transceiver. The FIFO also has an external clock input for coupling to a clock output, for example from the analog transceiver. The external clock signal clocks the data into the FIFO asynchronous with the primary digital transceiver clock signal at a frequency of chiprate(S). The internal clock signal clocks the data out of the FIFO, synchronous with the primary digital transceiver clock signal at a frequency of chiprate(S). When in a secondary power savings mode, the pulse swallower produces an output signal having a frequency of chiprate which is used to maintain CDMA network time, permitting the analog transceiver to be powered down during the secondary mode. In another embodiment of the invention, the external clock signal from the analog transceiver having a frequency of chiprate(S) is multiplied by (n) to produce the primary digital transceiver clock signal.

48 Claims, 7 Drawing Sheets

U.S. PATENT DOCUMENTS

| | | |
|---|---|---|
| 4,817,148 A | 3/1989 | Lafferty et al. |
| 5,007,088 A | 4/1991 | Ooi et al. |
| 5,103,459 A | 4/1992 | Gilhousen et al. |
| 5,228,054 A | 7/1993 | Rueth et al. |
| 5,311,176 A | 5/1994 | Gurney |
| 5,337,338 A | 8/1994 | Sutton et al. |
| 5,428,820 A | 6/1995 | Okada et al. |
| 5,499,280 A | 3/1996 | Wilson et al. |
| 5,517,521 A | 5/1996 | Strawn |
| 5,532,695 A | 7/1996 | Park et al. |
| 5,563,891 A | 10/1996 | Wang |
| 5,878,075 A | 3/1999 | Frank et al. |
| 5,883,889 A | 3/1999 | Faruque |

DEVICE AND METHOD FOR GENERATING CLOCK SIGNALS FROM A SINGLE REFERENCE FREQUENCY SIGNAL AND FOR SYNCHRONIZING DATA SIGNALS WITH A GENERATED CLOCK

CROSS-REFERENCE TO RELATED APPLICATIONS

This application is a divisional of U.S. application Ser. No. 09/322,282, filed May 28, 1999, now U.S. Pat. No. 6,289,067.

The following applications, assigned to the assignee of the current invention, contain material related to the subject matter of this application and are incorporated herein by reference:

U.S. Ser. No. 09/322,373, filed May 28, 1999 now U.S. Pat. No. 6,289,067, by J. McDonough, entitled "Method of and Apparatus for Generating Data Sequences for Use in Communications;"

U.S. Ser. No. 09/322,539, filed May 28, 1999 now U.S. Pat. No. 6,281,822, by E. Park, entitled "Pulse Density Modulator with Improved Pulse Distribution;"

U.S. Ser. No. 09/321,697, filed May 28, 1999, by J. McDonough et al., entitled "Method and Apparatus for Controlling System Timing with Use of a Master Timer;" and U.S. Ser. No. 09/322,240, filed May 28, 1999, by J. McDonough et al., entitled "Device and Method for Maintaining Time Synchronous with a Network Master Time."

BACKGROUND OF THE INVENTION

1. Field of the Invention

The invention relates to generating clock signals and synchronizing data signals with a generated clock signal. More particularly, the invention concerns processing a reference frequency signal to generate a plurality of clock signals, and synchronizing data signals with one of the generated clock signals.

2. Description of the Related Art

Code division multiple access (CDMA) cellular radiotelephone networks are a widely used type of spread spectrum communication system. Frequently, mobile telephones are small handheld units operating from battery power. Consequently, power conservation is a constant goal of handheld radiotelephone designers. A well known technique for saving power entails reducing the clock rate or completely cutting off the clock supplied to components of the radiotelephone that are not needed for the present mode of operation of the telephone. When the clock to selected components is reduced or eliminated, the telephone is in what is referred to as a secondary mode of operation.

For a CDMA radio telephone system to operate correctly, it is necessary for the radiotelephone to have a master timer that establishes and maintains synchronism with a CDMA network timer. To enable the radiotelephone to resume communications with a base station quickly and without using an excessive amount of power after leaving the secondary mode, the radiotelephone must maintain synchronism with the network timer even when the radiotelephone is in the secondary mode.

Typically, a radiotelephone has an analog transceiver that is commonly left operating when the radiotelephone is in the secondary mode, because the radiotelephone provides timing signals. However, leaving the analog transceiver operating during the secondary mode increases power consumption during the secondary mode due to the power consumption of the analog transceiver.

Consequently, there is a need for a way to maintain CDMA network time in a radiotelephone while the radiotelephone is in the secondary mode, without running the analog transceiver. Additionally, it would be desirable to clock a digital transceiver in a radiotelephone at a frequency higher than the commonly used frequency of chiprate(8), in order to allow for more efficient usage of digital transceiver resources through timesharing.

SUMMARY OF THE INVENTION

An illustrative embodiment of the invention is an integrated circuit device having a FIFO and a clock generator. The clock generator includes a pulse swallower that has an input for coupling to a reference frequency signal source, for example, from a voltage controlled temperature compensated crystal oscillator (VCTCXO). The pulse swallower eliminates pulses from the signal from the VCTCXO, producing a primary digital transceiver clock signal having a frequency of chiprate(S)(n), for example chiprate(16), at an output of the pulse swallower. The primary digital transceiver clock signal is used to clock the digital transceiver when the device is in a primary mode. An input of a first clock divider is coupled to the output of the pulse swallower. The first clock divider divides the frequency of the primary digital transceiver clock signal; to produce a FIFO output clock signal having a frequency of chiprate(S), for example chiprate(8). The output of the first clock divider is coupled to the output clock input of the FIFO. The FIFO has a data bus input for coupling to a data output, for example from an analog transceiver, providing data signals. The FIFO also has an external clock input for coupling to an output, for example from the analog transceiver, providing an external clock signal. The external clock signal is used to clock the data into the FIFO asynchronous with the primary digital transceiver clock signal at a frequency of chiprate(S), for example chiprate(8). The internal clock signal is used to clock the data out of the FIFO, synchronous with the primary digital transceiver clock signal at a frequency of chiprate (S), for example chiprate(8). Thus, the invention generates a primary digital transceiver clock signal having a frequency of chiprate(S)(n), for example chiprate(16), and synchronizes data from the analog transceiver with the generated primary digital transceiver clock signal.

Further, when in a secondary power savings mode, the pulse swallower produces an output signal having a frequency of chiprate, which is used to maintain CDMA network time without the need for any clock signals from the analog transceiver, thereby permitting the analog transceiver to be powered down during the secondary mode.

For some frequencies of the reference frequency signal, the primary digital transceiver clock signal produced at the output of the pulse swallower may have clock jitter which is too great for some applications. Consequently, in another illustrative embodiment of the invention, the external clock signal from the analog transceiver having a frequency of chiprate(S) is multiplied by (n), for example with a PLL, to produce the primary digital transceiver clock signal. As in the previously described embodiment, in this alternative embodiment, when the device is in the secondary mode, the chiprate signal for maintaining CDMA network time is generated with the external reference frequency source and the pulse swallower, allowing the analog transceiver to be powered down during the secondary mode to save power.

The invention can also be implemented as a radiotelephone and as a method. The invention advantageously provides for generation of a digital transceiver clock signal having a frequency that is higher than commonly used digital transceiver clock signals, to allow for more efficient usage of digital transceiver resources through timesharing.

The invention also provides for maintaining CDMA network time without operating the analog transceiver during the secondary mode, thereby reducing power consumption during the secondary mode. Additional advantages and benefits of the invention will be apparent from the following description.

DETAILED DESCRIPTION OF THE PREFERRED EMBODIMENTS

Figure 1:
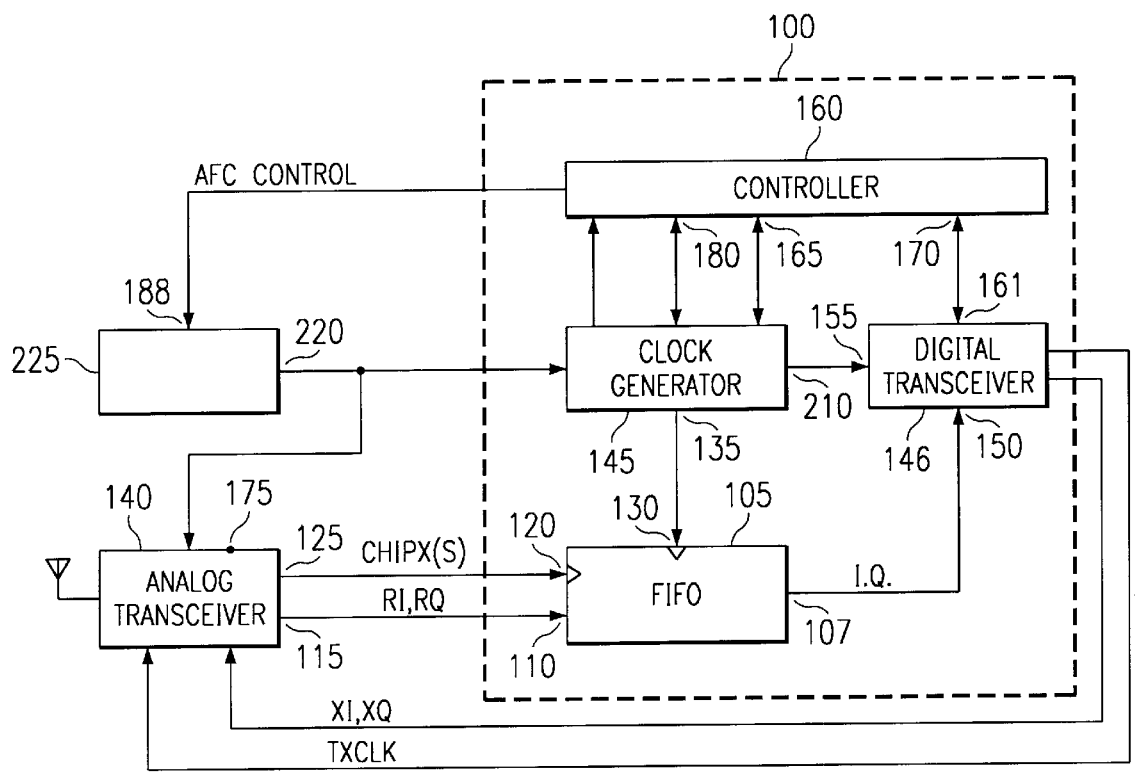
FIG. 1 is an integrated circuit device in its operative environment in accordance with illustrative embodiments of the invention.

Hardware Components and Interconnections
A. First Embodiment of Integrated Circuit Device FIG. 1 illustrates an integrated circuit device 100 according to an illustrative embodiment of the invention. The device 100 generates a plurality of clock signals from a single reference frequency signal and synchronizes data signals with one of the generated clock signals. Device 100 includes a FIFO 105 having a data bus output 107, and a data bus input 110 for coupling to an output 115 providing the data signals. The FIFO is a "first in first out" memory. Preferably the FIFO is a RAM. FIFO 105 also includes an external clock input 120 for coupling to an output 125 providing an external clock signal for clocking the data signals into the FIFO at a frequency of chiprate(S), and an output clock input 130 coupled to an output 135 providing a FIFO output clock signal for clocking the data signals out of the FIFO at a frequency of chiprate(S). Generally, the external clock signal will be asynchronous with the FIFO output clock signal. Preferably the output 115 that provides the data signals is the data output of an analog transceiver 140, and preferably the output 125 that provides the external clock signal is the first clock output of the analog transceiver. The data signals are inphase (RI) and quadrature (RQ) receive data signals.

Figure 2:
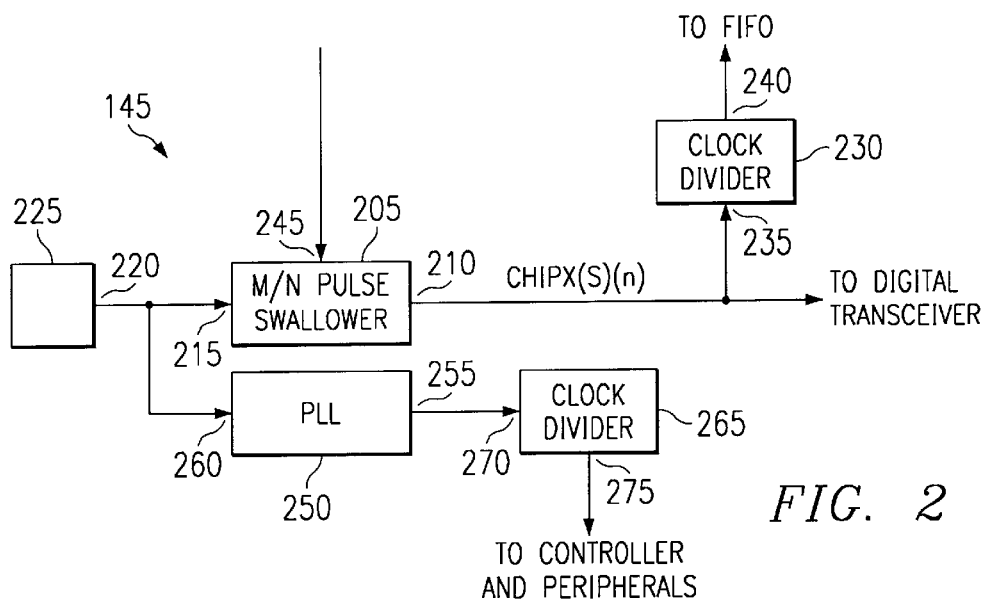
FIG. 2 is a clock generator in its operative environment in accordance with an illustrative embodiment of the invention.

Device 100 also includes a clock generator 145. The clock generator is shown in more detail in FIG. 2. The clock generator includes a pulse swallower 205 having an output 210, and an input 215 for coupling to an output 220 providing a reference frequency signal from a reference frequency source 225. The frequency of the reference frequency signal can be any frequency that can be used to produce a signal having a frequency of chiprate(S)(n), as described below. Preferably the frequency of the reference frequency signal is 19.68 MHz. Preferably the reference frequency source is a voltage controlled, temperature compensated crystal oscillator (VCTCXO). Alternatively, the reference frequency source is a voltage controlled crystal oscillator (VCXO). The pulse swallower produces a primary digital transceiver clock signal having a frequency of chiprate(S)(n), (sometimes referred to as "chipx(S)(n)"), at the output of the pulse swallower.

Clock generator 145 also includes a first clock divider 230 having an input 235 and an output 240. The input of the first clock divider is coupled to the output 210 of the pulse swallower, and the output 240 of the first clock divider is coupled to the output clock input 130 (FIG. 1) of the FIFO. The first clock divider produces the FIFO output clock signal at the output of the first clock divider.

Preferably the integrated circuit device includes a digital transceiver 146 having a data input 150 coupled to the data output 107 of the FIFO, a clock input 155 coupled to the output 210 of the pulse swallower, and a control port 160. As illustrated in FIG. 1, the digital transceiver has a data output for coupling inphase and quadrature transmit data signals to a transmit data input of the analog transceiver. The digital transceiver has a transmit clock output for coupling a transmit clock signal to a transmit,clock input of the analog transceiver.

Preferably, the pulse swallower has a control port 245. Further, preferably the integrated circuit device includes a controller 160 having a pulse swallower control port 165 coupled to the control port 245 (FIG. 2) of the pulse swallower and a digital transceiver control port 170 coupled to the control port of the digital transceiver. Preferably, the controller also includes an automatic frequency control port 185 for coupling to a control port 188 of the reference frequency source for locking the frequency of the reference frequency source to maintain synchronism between a master clock and CDMA network time.

Any of a number of chiprates can be used in CDMA systems. Preferably the chiprate is 1.2288 MHz, but larger and smaller values can also be used. Chiprate(S) is defined as the sample rate of the inphase and quadrature receive data. Chiprate(S) can also be described as the frequency of the external clock signal, which is preferably from the analog transceiver 140. Chiprate(S) is greater than the chiprate, due to oversampling of signals. In order for a master timer to be able to maintain time resolution at a fraction of a chip, the master timer must have a clock source having a frequency greater than the chiprate. For example, a clock source having a frequency of chiprate(8) is required to maintain resolution at ⅛ of the chiprate. Also, a clock source having a frequency higher than the chiprate facilitates timesharing of resources.

As mentioned above, the pulse swallower produces a primary digital transceiver clock signal having a frequency of chiprate(S)(n) at the output of the pulse swallower, with S and n being positive integers. "Chiprate(S)(n)" is a rate that is the chiprate multiplied by S multiplied by n. Preferably, S is a number selected from the group consisting of 4, 8, and 16, and n is a number selected from the group consisting of 1, 2, 3, 4, and 6. More preferably, S=8 and n=2.

The pulse swallower eliminates N−M of every N pulses from the reference frequency signal coupled to the input 215 of the pulse swallower, with N and M being integers, and with N≧M. Consequently, the pulse swallower can be configured to remove any number of pulses, and preferably the number of pulses to be removed is programmable. Pulse swallowers are known in the art and can be implemented, for example, as a finite state machine, such as a counter that triggers a gate to bypass one or more pulses when the counter reaches its terminal value. When the frequency of the reference frequency signal is 19.68 MHz and the primary digital transceiver clock signal is 19.6608 MHz, preferably the pulse swallower eliminates one out of every 1025 pulses. When the frequency of the reference frequency signal is 19.68 MHz and the primary digital transceiver clock signal is chiprate(8), preferably the pulse swallower eliminates 513 out of every 1025 pulses. When the frequency of the reference frequency signal is 19.8 MHz and the primary digital transceiver clock signal is chiprate(16), preferably the pulse swallower eliminates 29 out of every 4125 pulses. When the frequency of the reference frequency signal is 19.8 MHz and the primary digital transceiver clock signal is chiprate(8), preferably the pulse swallower eliminates 2077 out of every 4125 pulses.

The integrated circuit device may also include a PLL 250 having an output 255, and an input 260 for coupling to the output 220 that provides the reference frequency signal from the reference frequency source. The integrated circuit device may also include a second clock divider 265 having an input 270 and at least one output 275, with the input of the second clock divider being coupled to the output of the PLL. Each output of the second clock divider produces an additional clock signal, which may be connected, for example, to the controller and/or to peripheral devices such as a keyboard and display.

B. Second Embodiment of Integrated Circuit Device

FIG. 1 also illustrates an integrated circuit device 100 according to a second illustrative embodiment of the invention. In the second embodiment the device 100 generates a plurality of clock signals from a first clock signal and synchronizes data signals with one of the generated clock signals. The structure for the second embodiment is generally the same as the structure described above for the first embodiment except for the structure of the clock generator, and except that the clock signal coupled to the input of the clock generator, which in this case is the input to the PLL, is a first clock signal.

Figure 3:
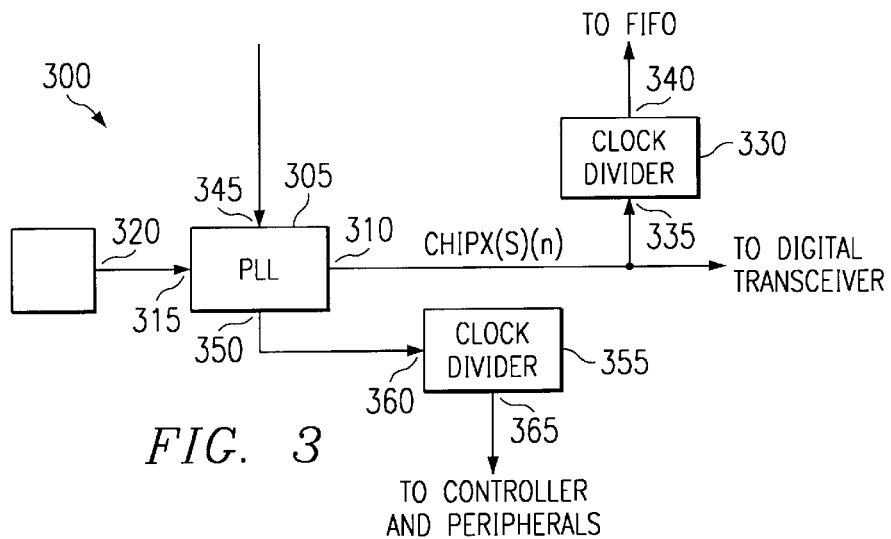
FIG. 3 is another embodiment of a clock generator in its operative environment in accordance with an illustrative embodiment of the invention.

For the second embodiment, the clock generator 145 of FIG. 1 is illustrated in more detail in FIG. 3 as clock generator 300. Clock generator 300 includes a PLL 305 having a first output 310, and an input 315 for coupling to an output 320 providing a first clock signal. The frequency of the first clock signal can be any frequency that can be used to produce a signal having a frequency of chiprate(S)(n). Preferably, the first clock signal has a frequency that is the chiprate or an integer multiple of the chiprate. Preferably output 320 that produces the first clock signal is an output of a voltage controlled, temperature compensated crystal oscillator (VCTCXO). Alternatively, the output 320 that produces the first clock signal is an output of a voltage controlled crystal oscillator (VCXO). Alternatively, the output 320 that produces the first clock signal is the first clock output 125 (FIG. 1) of the analog transceiver 140. Alternatively, the output 125 providing the external clock signal is a first clock output of the analog transceiver, and the output 320 that produces the first clock signal is an optional second clock output 175 (FIG. 1) of the analog transceiver 125, wherein the first clock signal has a different frequency that the external clock signal.

The PLL multiplies the frequency of the first clock signal by p to produce a primary digital transceiver clock signal having a frequency of chiprate(S)(n) at the output of the PLL, with S and n being positive integers. Generally, p can be any number greater than or equal to one. Preferably, p is an integer selected from the group consisting of 1, 2, 3, 4, 6, and 8. More preferably, p is 2 or p is 4. Preferably, S is a number selected from the group consisting of 4, 8, and 16, and n is a number selected from the group consisting of 1, 2, 3, 4, and 6. More preferably, S=8 and n=2.

Clock generator 300 also includes a first clock divider 330 having an input 335 and an output 340. The input of the first clock divider is coupled to the output 310 of the PLL, and the output 340 of the first clock divider is coupled to the output clock input 130 (FIG. 1) of the FIFO. The first clock divider produces the FIFO output clock signal at the output of the first clock divider.

Preferably, the PLL has a control port 345. Also, preferably the integrated circuit device includes a digital transceiver 146 having a data input 150 coupled to the data output 107 of the FIFO, a clock input 155 coupled to the output 310 of the PLL, and a control port 160. As illustrated in FIG. 1, the digital transceiver has a data output coupled to a data input of the analog transceiver for coupling inphase and quadrature transmit data signals to a transmit data input of the analog transceiver. The digital transceiver has a transmit clock output for coupling a transmit clock signal to a transmit clock input of the analog transceiver. Further, preferably the integrated circuit device includes a controller 160 having a PLL control port 165 coupled to the control port 345 (FIG. 3) of the PLL and a digital transceiver control port 170 coupled to the control port of the digital transceiver.

The PLL may also have a second output 350. The integrated circuit device may also include a second clock divider 355 having an input 360 and at least one output 365, with the input of the second clock divider being coupled to the second output of the PLL. Each output of the second clock divider produces an additional clock signal, which may be connected, for example, to the controller and/or to peripheral devices such as a keyboard and display.

C. Third Embodiment of Integrated Circuit Device

FIG. 1 also illustrates an integrated circuit device 100 according to a third illustrative embodiment of the invention. In the third embodiment the device 100 generates a plurality of clock signals from a single reference frequency signal and synchronizes data signals with one of the generated clock signals. The structure for the third embodiment is generally the same as the structure described above for the first embodiment except for the structure of the clock generator.

Figure 4:
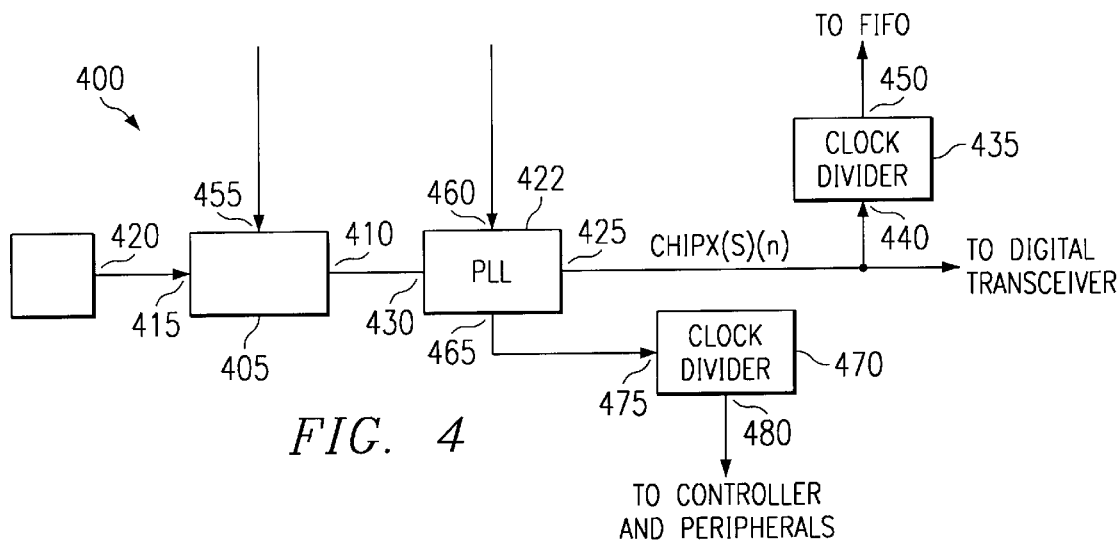
FIG. 4 is another embodiment of a clock generator in its operative environment in accordance with an illustrative embodiment of the invention.

For the third embodiment, the clock generator 145 of FIG. 1 is illustrated in more detail in FIG. 4 as clock generator 400. Clock generator 400 includes a pulse swallower 405 having an output 410, and an input 415 for coupling to an output 420 providing a reference frequency signal from a reference frequency source. The frequency of the reference frequency signal can be any frequency that can be used to produce a signal having a frequency of chiprate(S)(n). Preferably the frequency of the reference frequency signal is 9.84 MHz. Preferably the reference frequency source is a voltage controlled, temperature compensated crystal oscillator (VCTCXO). Alternatively, the reference frequency source is a voltage controlled crystal oscillator (VCXO).

The clock generator also includes a PLL 422 that has a first output 425 and input 430 that is coupled to the output 410 of the pulse swallower. The PLL multiplies the frequency of the signal from the output of the pulse swallower by p to produce a primary digital transceiver clock signal having a frequency of chiprate(S)(n) at the output of the PLL. Generally, p can be any number greater than or equal to one. Preferably, p is an integer selected from the group consisting of 2, 3, 4, 5, 6, 7 and 8. More preferably, p is 2, 3, or 4. Preferably, S is a number selected from the group consisting of 4, 8, and 16, and n is a number selected from the group consisting of 1, 2, 3, 4, and 6. More preferably, S=8 and n=2.

The pulse swallower eliminates N−M of every N pulses from the reference frequency signal coupled to the input 415 of the pulse swallower, with N and M being integers, and with N≧M. Consequently, the pulse swallower can be configured to remove any number of pulses, for example one out of every 1025 pulses, 513 out of every 1025 pulses, 29 out of every 4125 pulses, or 2077 out of every 4125 pulses.

Clock generator 400 also includes a first clock divider 435 having an input 440 and an output 450. The input of the first clock divider is coupled to the output 425 of the PLL, and the output 450 of the first clock divider is coupled to the output clock input 130 (FIG. 1) of the FIFO. The first clock divider produces the FIFO output clock signal at the output of the first clock divider.

Preferably, the pulse swallower has a control port 455 and the PLL has a control port 460. Also, preferably the integrated circuit device includes a digital transceiver 146 having a data input 150 coupled to the data output 107 of the FIFO, a clock input 155 coupled to the output 425 of the PLL, and a control port 160. As illustrated in FIG. 1, the digital transceiver has a data output coupled to a data input of the analog transceiver for coupling inphase and quadrature transmit data signals to a transmit data input of the analog transceiver. The digital transceiver has a transmit clock output for coupling a transmit clock signal to a transmit clock input of the analog transceiver. Further, preferably the integrated circuit device includes a controller 160 having a PLL control port 165 coupled to the control port 460 (FIG. 4) of the PLL, a digital transceiver control port 170 coupled to the control port 160 of the digital transceiver, and a pulse swallower control port 180 coupled to the control port 455 of the pulse swallower.

The PLL may also have a second output 465. The integrated circuit device may also include a second clock divider 470 having an input 475 and at least one output 480, with the input of the second clock divider being coupled to the second output of the PLL. Each output of the second clock divider produces an additional clock signal, which may be connected, for example, to the controller and/or to peripheral devices such as a keyboard and display.

D. Fourth Embodiment of Integrated Circuit Device

FIG. 1 also illustrates an integrated circuit device 100 according to a fourth illustrative embodiment of the invention. In the fourth embodiment the device 100 generates a plurality of clock signals from a single reference frequency signal and synchronizes data signals with one of the generated clock signals. The structure for the first embodiment is generally the same as the structure described above for the first embodiment except for the structure of the clock generator.

Figure 5:
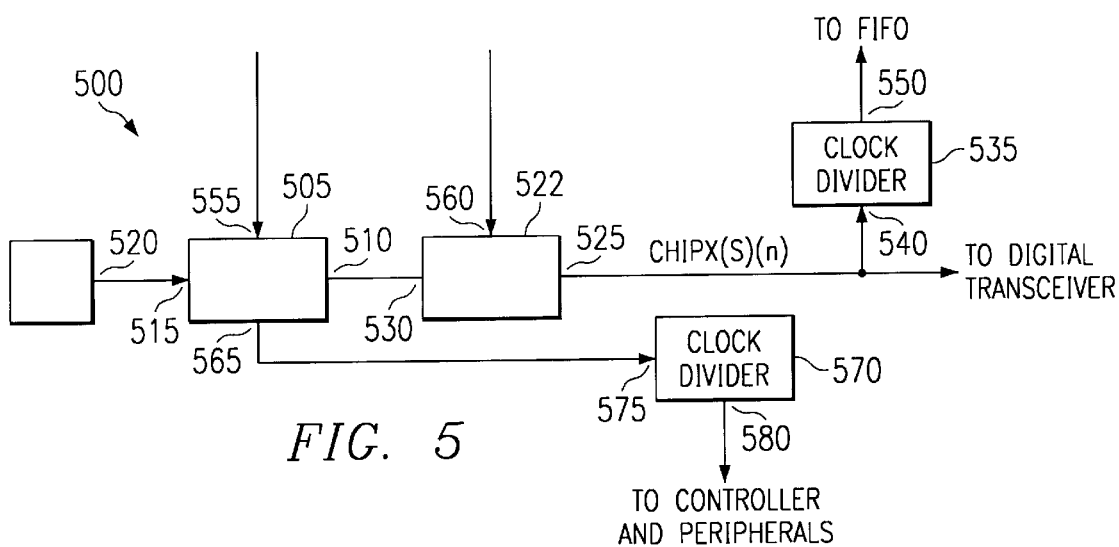
FIG. 5 is another embodiment of a clock generator in its operative environment in accordance with an illustrative embodiment of the invention.

For the fourth embodiment, the clock generator 145 of FIG. 1 is illustrated in more detail in FIG. 5 as clock generator 500. Clock generator 500 includes a PLL 505 having a first output 510, and an input 515 for coupling to an output 520 providing a reference frequency signal from a reference frequency source. The frequency of the reference frequency signal can be any frequency that can be used to produce a signal having a frequency of chiprate(S)(n). Preferably the frequency of the reference frequency signal is 9.84 MHz. Preferably the reference frequency source is a voltage controlled, temperature compensated crystal oscillator (VCTCXO). Alternatively, the reference frequency source is a voltage controlled crystal oscillator (VCXO).

The PLL multiplies the frequency of the signal from the output: of the reference frequency source by p. Generally, p can be any number greater than or equal to one. Preferably, p is an integer selected from the group consisting of 2, 3, 4, 5, 6, 7 and 8. More preferably, p is 2, 3, or 4.

The clock generator also includes a pulse swallower 522 that has an output 525 and an input 530 that is coupled to the output 510 of the PLL. The pulse swallower eliminates pulses from the signal from the output of the PLL to produce a primary digital transceiver clock signal having a frequency of chiprate(S)(n) at the output of the pulse swallower. Preferably, S is a number selected from the group consisting of 4, 8, and 16, and n is a number selected from the group consisting of 1, 2, 3, 4, and 6. More preferably, S=8 and n=2.

The pulse swallower eliminates N−M of every N pulses from signal coupled to the input 530 of the pulse swallower, with N and M being integers, and with N≧M. Consequently, the pulse swallower can be configured to remove any number of pulses, for example one out of every 1025 pulses, 513 out of every 1025 pulses, 29 out of every 4125 pulses, or 2077 out of every 4125 pulses.

Clock generator 500 also includes a first clock divider 535 having an input 540 and an output 550. The input of the first clock divider is coupled to the output 525 of the pulse swallower, and the output 550 of the first clock divider is coupled to the output clock input 130 (FIG. 1) of the FIFO. The first clock divider produces the FIFO output clock signal at the output of the first clock divider.

Preferably, the PLL has a control port 555 and the pulse swallower has a control port 560. Also, preferably the integrated circuit device includes a digital transceiver 146 having a data input 150 coupled to the data output 107 of the FIFO, a clock input 155 coupled to the output 525 of the pulse swallower, and a control port 160. As illustrated in FIG. 1, the digital transceiver has a data output coupled to a data input of the analog transceiver for coupling inphase and quadrature transmit data signals to a transmit data input of the analog transceiver. The digital transceiver has a transmit clock output for coupling a transmit clock signal to a transmit clock input of the analog transceiver. Further, preferably the integrated circuit device includes a controller 160 having a pulse swallower control port 165 coupled to the control port 560 (FIG. 5) of the pulse swallower, a digital transceiver control port 170 coupled to the control port 160 of the digital transceiver, and a PLL control port 180 coupled to the control port 555 of the PLL.

The PLL may also have a second output 565. The integrated circuit device may also include a second clock divider 570 having an input 575 and at least one output 580, with the input of the second clock divider being coupled to the second output of the PLL. Each output of the second clock divider produces an additional clock signal, which may be connected, for example, to the controller and/or to peripheral devices such as a keyboard and display.

E. Radiotelephone

Figure 6:
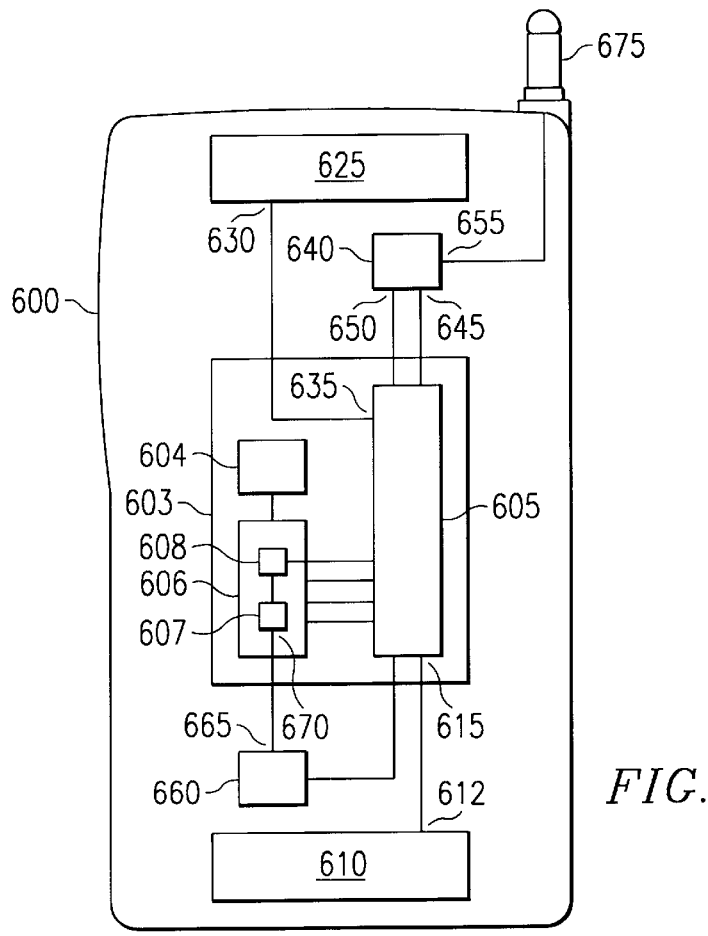
FIG. 6 is a radiotelephone in accordance with an illustrative embodiment of the invention.

FIG. 6 illustrates a radiotelephone 600 according to a fifth illustrative embodiment of the invention. The radiotelephone includes an application specific integrated circuit (ASIC) 603 which includes a FIFO 604, a controller 605, and a clock generator 606 including a pulse swallower 607 and a first clock divider 608, and is substantially the same as the integrated circuit device 100 shown in FIGS. 1 and 2 and described above. The radiotelephone also includes a keypad 610 having an output 612 coupled to an input 615 of the controller 605, and a display 625 having an input 630 coupled to an output 635 of the controller. The radiotelephone further includes an analog transceiver 640 having an output 645 providing the data signals, an output 650 providing the external clock signal, an antenna input 655, and a VCTCXO 660 having an output 665 coupled to an input 670 of the pulse swallower 607. The radiotelephone additionally includes an antenna 675 coupled to the antenna input 655 of the analog transceiver.

F. Fifth Embodiment of Integrated Circuit Device

Figure 7:
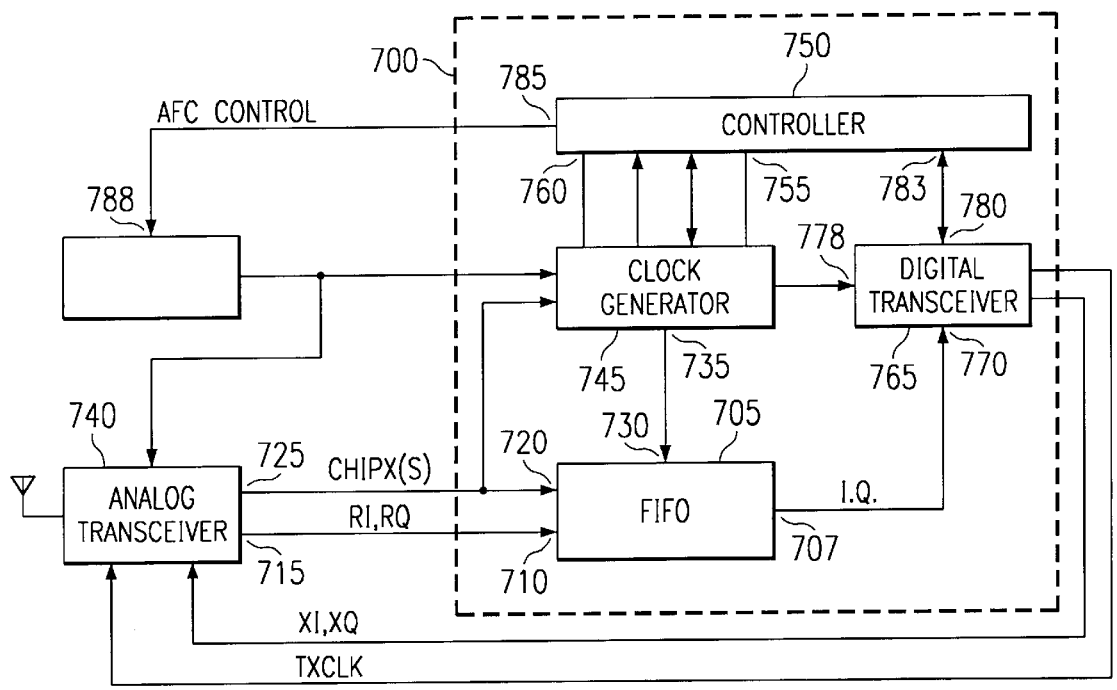
FIG. 7 is an integrated circuit device in its operative environment in accordance with illustrative embodiments of the invention.

FIG. 7 illustrates an integrated circuit device 700 according to a another illustrative embodiment of the invention. The device 700 generates a plurality of clock signals from a single reference frequency signal and synchronizes data signals with one of the generated clock signals. Device 700 includes a FIFO 705 having .a data bus output 707, and a data bus input 710 for coupling to an output 715 providing the data signals. FIFO 705 also includes an external clock input 720 for coupling to an output 725 providing a first external clock signal for clocking the data signals into the FIFO at a frequency of chiprate(S), and an output clock input 730 coupled to an output 735 providing a FIFO output clock signal for clocking the data signals out of the FIFO at a frequency of chiprate(S). Generally, the first external clock signal will be asynchronous with the FIFO output clock signal. The first external clock signal will generally have a frequency that is an integer multiple of the chiprate. Preferably the output 715 that provides the data signals is the data output of an analog transceiver 740, and preferably the output 725 that provides the external clock signal is the first clock output of the analog transceiver. The data signals are inphase (RI) and quadrature (RQ) receive data signals.

Figure 8:
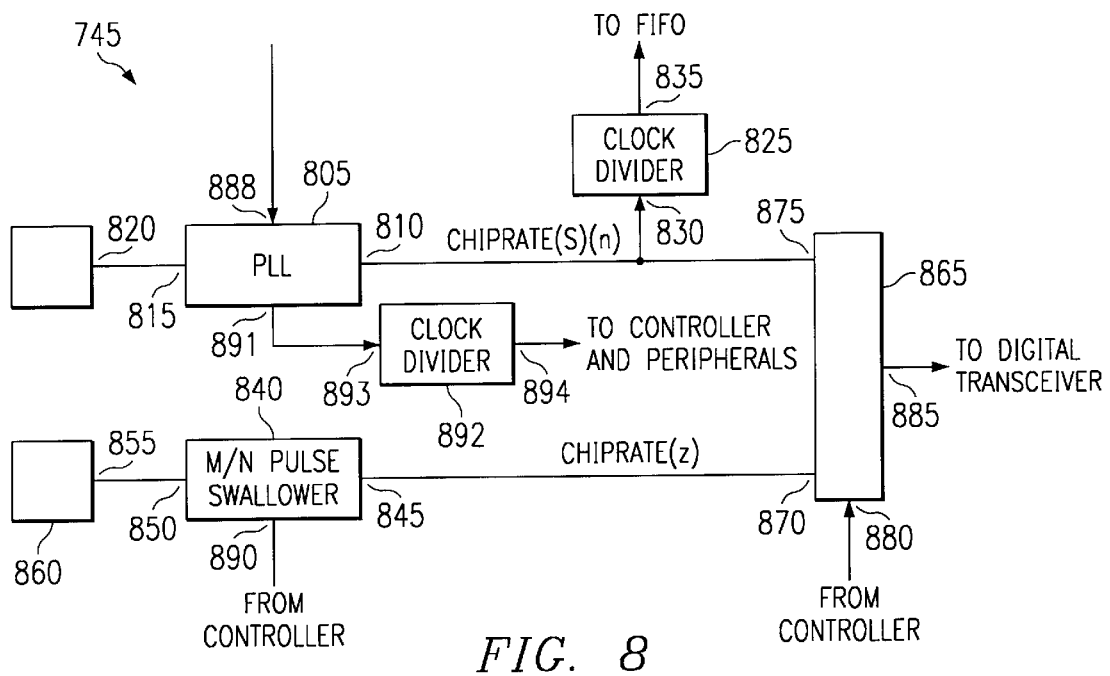
FIG. 8 is another embodiment of a clock generator in its operative environment in accordance with an illustrative embodiment of the invention.

Device 700 also includes a clock generator 745. The clock generator 745 is shown in more detail in FIG. 8. Clock register 745 includes a PLL 805 which has an output 810, and an input 815 for coupling to an output 820 providing a second external clock signal. Preferably the output 820 is the output 725 of the analog transceiver, in which case the first external clock signal and the second external clock signal are the same. Alternatively, the output 820 providing the second clock signal could be the output of an analog transceiver. The PLL multiplies the frequency of the second external clock signal by p to produce a primary digital transceiver clock signal at the output of the PLL having a frequency of chiprate(S)(n), with S and n being positive integers. Preferably, S is a number selected from the group consisting of 4, 8, and 16, and n is a number selected from the group consisting of 1, 2, 3, 4, and 6. More preferably, S=8 and n=2. Preferably p is an integer selected from the group consisting of 1, 2, 3, 4, 6, and 8. More preferably p is equal to 2 or p is equal to 4.

Clock generator 745 also includes a first clock divider 825 having an input 830 and an output 835. The input of the first clock divider is coupled to the output 810 of the PLL, and the output 835 of the first clock divider is coupled to the output clock input 730 (FIG. 7) of the FIFO. The first clock divider produces the FIFO output clock signal at the output of the first clock divider.

Clock generator 745 also includes a pulse swallower 840 having an output 845, and an input 850 for coupling to an output 855 providing a reference frequency signal from a reference frequency source 860. The frequency of the reference frequency signal can be any frequency that can be used to produce a signal having a frequency of chiprate(z), (which is defined as the chiprate multiplied by z). Generally, z can be any number greater than or equal to one, and preferably z is one. Preferably the frequency of the reference frequency signal is 19.2 MHz. Preferably the reference frequency source is a voltage controlled, temperature compensated crystal oscillator (VCTCXO). Alternatively, the reference frequency source is a voltage controlled crystal oscillator (VCXO).

Clock generator 745 also includes a first multiplexer 865 having a first input 870, a second input 875, a control port 880, and an output 885. The first input 870 of the multiplexer is coupled to the output 845 of the pulse swallower, and the second input 875 of the multiplexer is coupled to the output 810 of the PLL.

The device also includes a controller 750 (FIG. 7) having a first multiplexer control port 755 coupled to the control port 880 (FIG. 8) of the first multiplexer. The controller produces a control signal at the control port 755 for selecting either the first input or the second input of the multiplexer, for selectively providing either the primary digital transceiver clock signal from the output of the PLL or the secondary master clock signal from the output of the pulse swallower at the output of the first multiplexer.

Preferably, the PLL has a control port 888 (FIG. 8) coupled to a PLL control port 760 (FIG. 7) of the controller 750, and the pulse. swallower has a control port 890 coupled to a pulse swallower control port 765 of the controller. Preferably, the controller also includes an automatic frequency control port 785 for coupling to a control port 788 of the reference frequency source for locking the frequency of the reference frequency source to maintain synchronism between a master clock and CDMA network time.

Also, preferably the integrated circuit device includes a digital transceiver 765 having a data input 770 coupled to the data bus output 707 of the FIFO, a clock input 778 coupled to the output 885 of the first multiplexer, and a control port 780 coupled to a control port 783 of the controller. As illustrated in FIG. 7, the digital transceiver has a data output for coupling inphase and quadrature transmit data signals to a transmit data input of the analog transceiver. The digital transceiver has a transmit clock output for coupling a transmit clock signal to a transmit clock input of the analog transceiver.

The pulse swallower eliminates N–M of every N pulses from the reference frequency signal coupled to the input 850 of the pulse swallower, with N and M being integers, and with N≧M. Consequently, the pulse swallower can be configured to remove any number of pulses. When the frequency of the reference frequency signal is 19.68 MHz and z=1, preferably the pulse swallower eliminates 1 out of every 1025 pulses. When the frequency of the reference frequency signal is 19.8 MHz and z=1, preferably the pulse swallower eliminates 4096 out of every 4125 pulses. When the frequency of the reference frequency signal is 19.2 MHz and z=1, preferably the pulse swallower eliminates 64 out of every 125 pulses.

The PLL may also have a second output 891. The integrated circuit device may also include a second clock divider 892 having an input 893 and at least one output 894, with the input of the second clock divider being coupled to the second output of the PLL. Each output of the second clock divider produces an additional clock signal, which may be connected, for example, to the controller and/or to peripheral devices such as a keyboard and display.

G. Alternative Embodiment of Clock Generator

Figure 9:
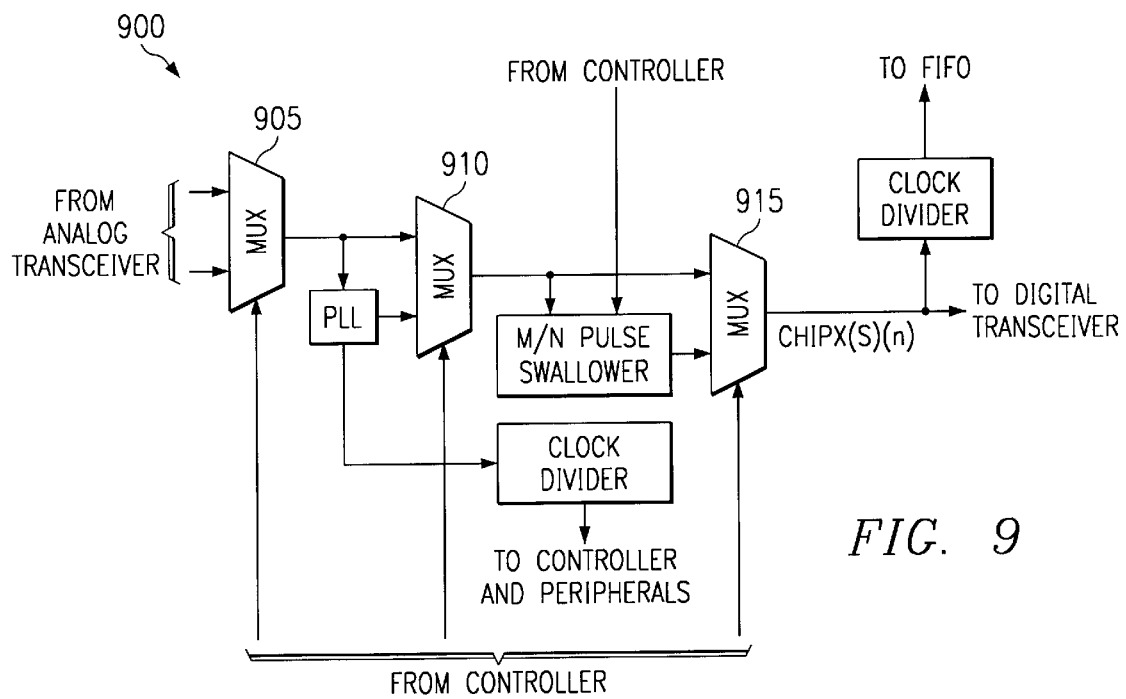
FIG. 9 is another embodiment of a clock generator in its operative environment in accordance with an illustrative embodiment of the invention.

Herein the phrase "coupled to" is defined to mean that an additional component or components can be interposed between a first element that is "coupled to" to a second element. Similarly, herein the phrase "for coupling" is defined to mean that an additional component or components can be interposed between a first element that is "for coupling" to an external output, input, port, or device. In other words, "coupled to" and "for coupling" are not limited to mean only direct connections with no interposed component or components. The interposed component or components can be any type of components, devices, or elements, for example, a multiplexer, a PLL, a clock divider, a pulse swallower, a logic gate, etc. FIG. 9 illustrates this concept by showing an alternative embodiment of a clock generator 900, employing multiplexers 905, 910, and 915 interposed between various elements of the clock generator.

H. Digital Transceiver

Figure 10:
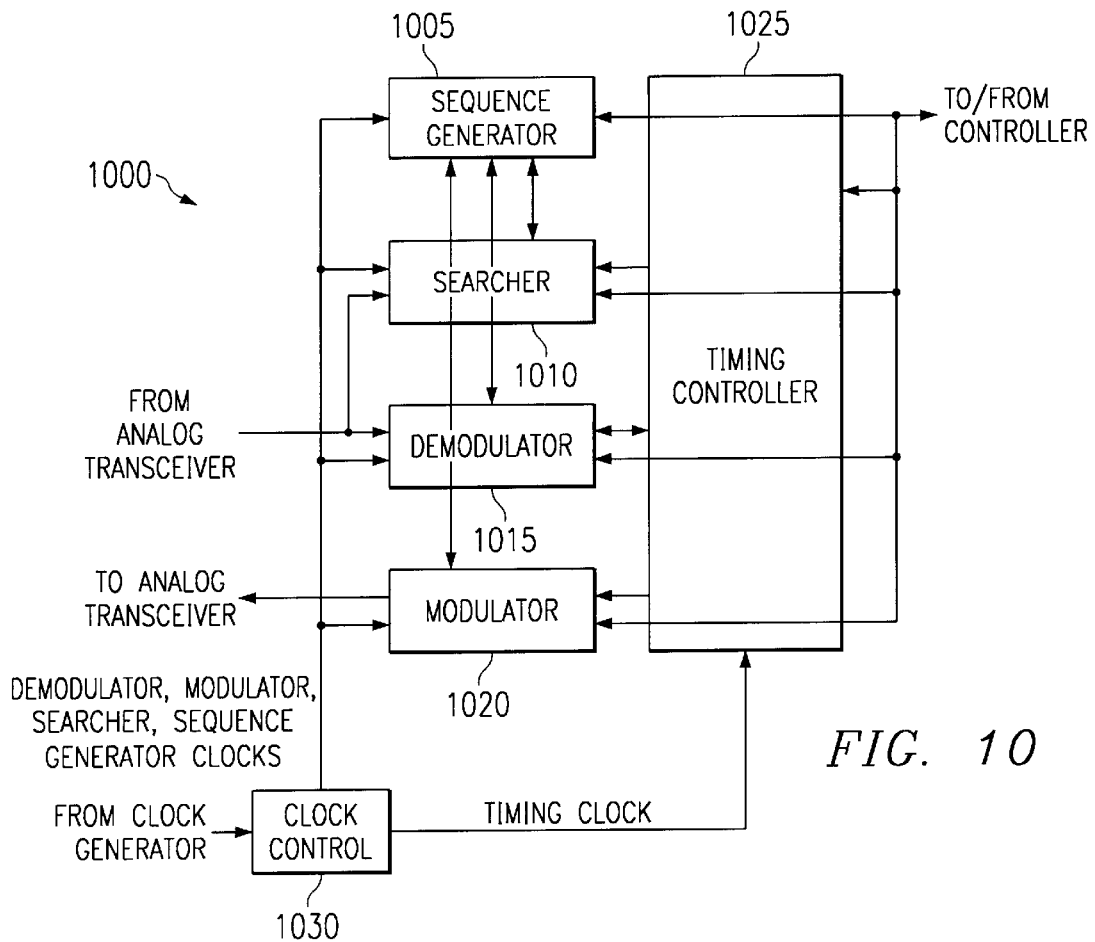
FIG. 10 is a block diagram of a digital transceiver in its operative environment in accordance with an illustrative embodiment of the invention.

FIG. 10 illustrates details of a digital transceiver 1000 that may be used as the digital transceiver in an integrated circuit device in accordance with the invention. The main functional blocks of the digital transceiver are a sequence generator 1005, a searcher 1010, a demodulator 1015, a modulator 1020, a timing controller 1025, and a clock control 1030.

I. Methods

Additional aspects of the invention are embodied as methods. Although the methods may be practiced with any of a number of hardware configurations, for clarity of explanation, but with no limitation intended thereby, the tasks of the methods are described in the context of hardware embodiments of the invention described herein.

J. First Method for Generating a Plurality of Clock Signals

Figure 11:
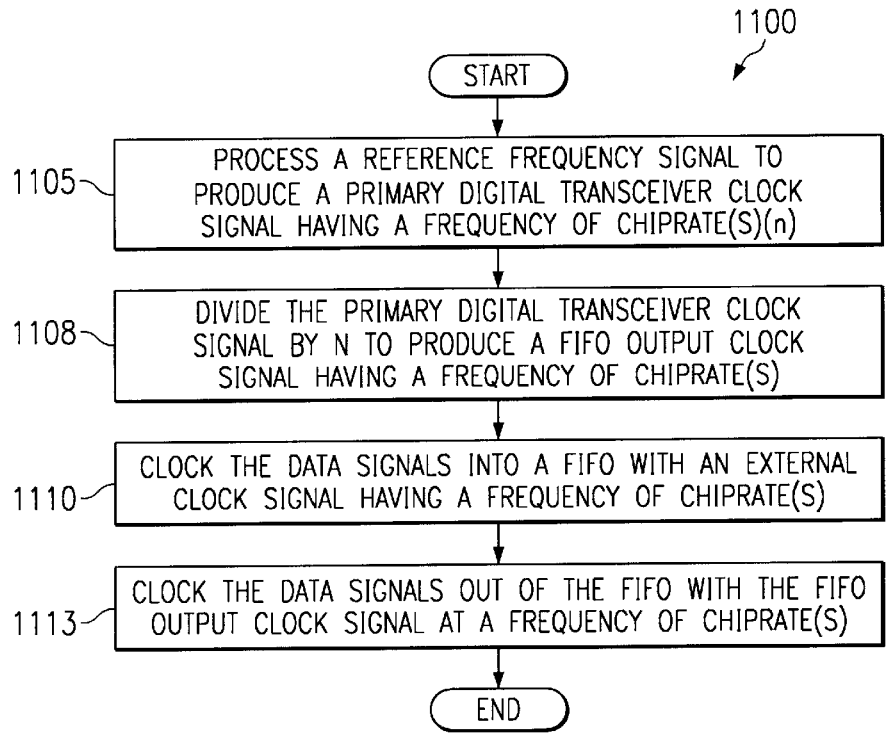
FIG. 11 is a flow chart of a method for generating a plurality of clock signals from a single reference frequency signal and synchronizing data signals with one of the generated clock signals in accordance with an illustrative embodiment of the invention.

A first method embodiment of the invention is a method for generating a plurality of clock signals from a single reference frequency signal and synchronizing data signals with one of the generated clock signals. The tasks of this method are illustrated by the tasks of the flowchart 1100 in FIG. 11.

In task 1105, a reference frequency signal is processed to produce a primary digital transceiver clock signal having a frequency of chiprate(S)(n). In one embodiment, processing the reference frequency signal includes eliminating pulses from the reference signal. Generally, N–M of every N pulses can be eliminated, wherein N and M are integers, and N≧M. Different numbers of pulses will be eliminated depending on the frequency of the reference frequency source. For example, when a reference frequency signal having a frequency of 19.68 is used, preferably one out of every 1025 pulses is eliminated from the reference frequency signal. The number of pulses eliminated for several other common reference frequency signal frequencies are: eliminate 513 out of every 1025 pulses; eliminate 29 out of every 4125 pulses; and, eliminate 2077 out of every 4125 pulses.

In another embodiment, processing the reference frequency signal includes multiplying the frequency of the reference frequency signal. In another embodiment, processing the reference frequency signal includes multiplying the frequency of the reference frequency signal by p to produce a first altered signal, and eliminating pulses from the first altered signal to produce the primary digital transceiver clock signal having a frequency of chiprate(S)(n). In yet another embodiment, processing the reference frequency signal includes eliminating pulses from the reference frequency signal to produce a second altered signal, and multiplying the frequency of the second altered signal by p to produce the primary digital transceiver clock signal having a frequency of chiprate(S)(n).

In task 1108, the primary digital transceiver clock signal is divided by n to produce a FIFO output clock signal having a frequency of chiprate(S). In task 1110, the data signals are clocked into a FIFO with an external clock signal having a frequency of chiprate(S). The external clock signal will generally be asynchronous with the FIFO output clock signal. In task 1113, the data signals are clocked out of the FIFO with the FIFO output clock signal at a frequency of chiprate(S).

Generally, S and n are positive integers. Preferably S is a number selected from the group consisting of 4, 8, and 16, and n is a number selected from the group consisting of 1, 2, 3, 4, and 6. More preferably S=8 and n=2. Preferably, p is an integer selected from the group consisting of 1, 2, 3, 4, 6, and 8. More preferably, p is 2 or p is 4.

Figures 12, 13:
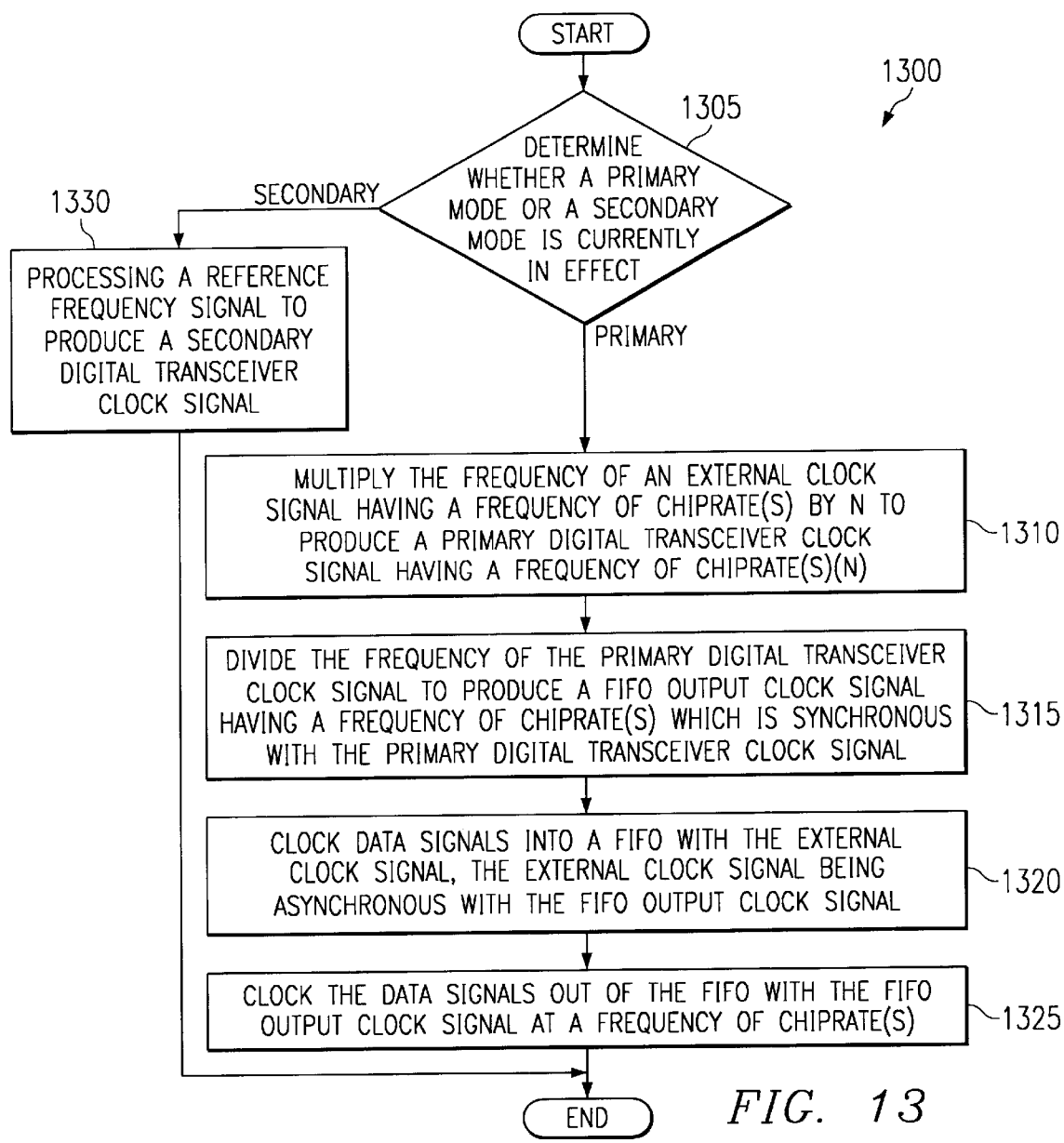
FIG. 12 is a flow chart showing optional additional steps of the method of FIG. 11.
FIG. 13 is a flow chart of a method for a method for generating a plurality of clock signals in accordance with an illustrative embodiment of the invention.

The method may optionally also include task 1115 (FIG. 12) wherein the frequency of the reference frequency signal is multiplied by g to produce a third altered signal, with g being a number greater than one, and task 1118 (FIG. 12) wherein the frequency of the third altered signal is divided by h to produce an additional clock signal, with h being a number greater than one.

Preferably the reference frequency source is a VCTCXO. Alternatively, the reference frequency source can be a VCXO. Preferably, the output that provides the external clock signal is a clock output of an analog transceiver. Similarly the output that provides the data signals is preferably a data output of an analog transceiver.

K. Second Method For Generating a Plurality of Clock Signals

A second method embodiment of the invention is a method for generating a plurality of clock signals. The tasks of this method are illustrated by the tasks of the flowchart 1300 in FIG. 13.

In task 1305, it is determined whether a primary mode or a secondary mode is currently in effect. The primary mode is defined as a mode of operation in which CDMA network time must be maintained and in which a digital transceiver clock signal having a frequency of chiprate(S)(n) is needed. The secondary mode is defined as a mode of operation in which CDMA network time must be maintained but in which a digital transceiver clock signal having a frequency of chiprate(S)(n) is not needed. The secondary mode may exist, for example, during a sleep mode.

If it is determined that a primary mode is in effect, then tasks 1310 through 1325 are performed. In task 1310 the frequency of an external clock signal having a frequency of chiprate(S) is multiplied by n to produce a primary digital transceiver clock signal having a frequency of chiprate(S)(n). In task 1315 the frequency of the primary digital transceiver clock signal is divided to produce a FIFO output clock signal having a frequency of chiprate(S) which is synchronous with the primary digital transceiver clock signal. In task 1320, data signals are clocked into a FIFO with the external clock signal. Generally, the external clock signal will be asynchronous with the FIFO output clock signal. In task 1325, data signals are clocked out of the FIFO with the FIFO output clock signal at a frequency of chiprate(S).

If it is determined that a secondary mode is in effect, then task 1330 is performed. In task 1330, a reference frequency signal is processed to produce a secondary digital transceiver clock signal. Preferably, the secondary digital transceiver clock signal has a frequency of chiprate.

Figure 14:
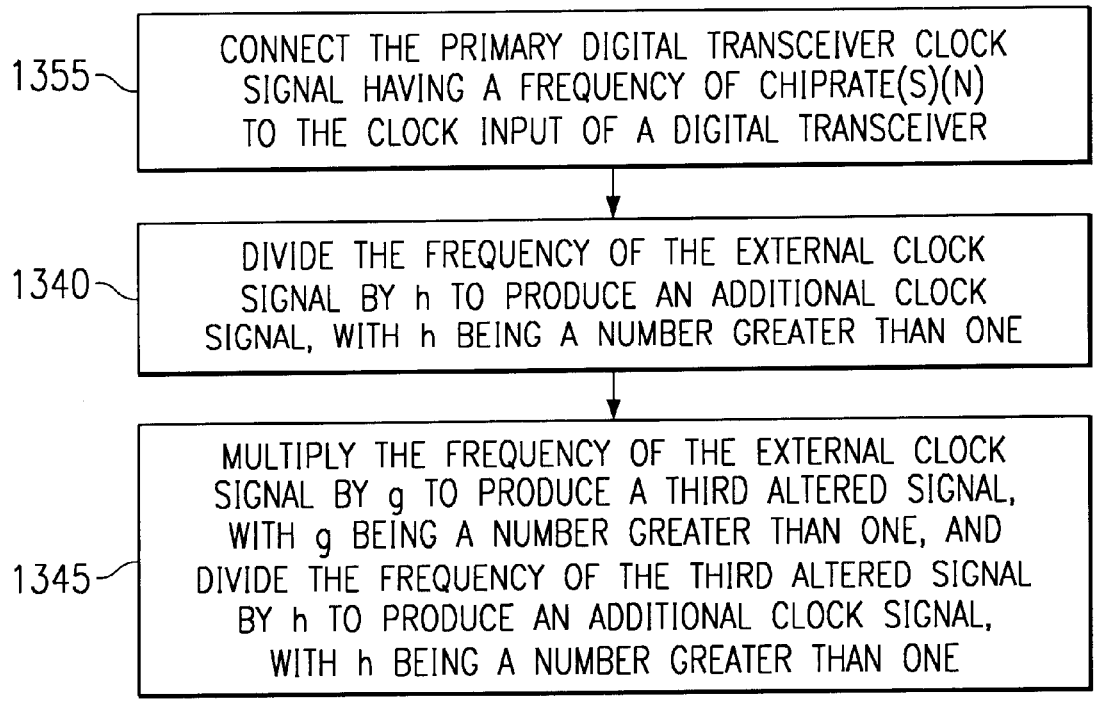
FIG. 14 is a flow chart showing optional additional steps of the method of FIG. 13.

If it is determined that the primary mode is in effect, the method may optionally include task 1335 (FIG. 14), wherein the primary digital transceiver clock signal having a frequency of chiprate(S)(n) is connected to the clock input of a digital transceiver.

If it is determined that the primary mode is in effect, optionally task 1340 (FIG. 14) may be performed, wherein the frequency of the external clock signal is divided by h to produce an additional clock signal, with h being a number greater than one.

If it is determined that the primary mode is in effect, optionally task 1345 (FIG. 14) may be performed, wherein the frequency of the external clock signal is multiplied by g to produce a third altered signal, with g being a number greater than one, and in task 1250, the frequency of the third altered signal is divided by h to produce an additional clock signal, with h being a number greater than one.

Figure 15:
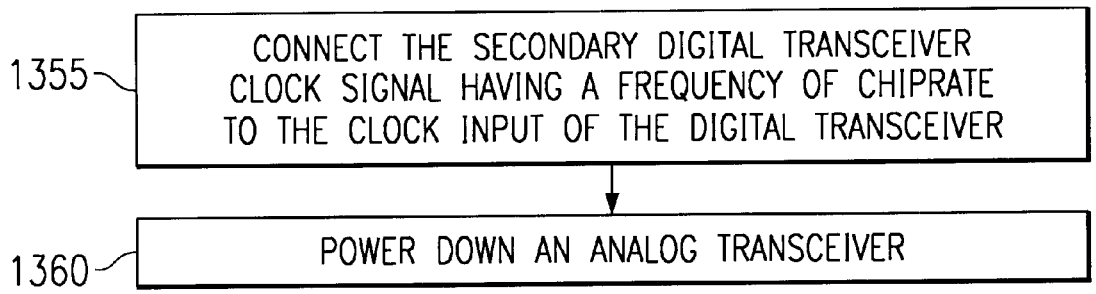
FIG. 15 is a flow chart showing optional additional steps of the method of FIG. 13.

If it is determined that the secondary mode is in effect, the method may optionally include task 1355 (FIG. 15), wherein the secondary digital transceiver clock signal having a frequency of chiprate is connected to the clock input of the digital transceiver.

If it is determined that the secondary mode is in effect, optionally task 1360 (FIG. 15) may be performed, wherein an analog transceiver is powered down.

Generally, S and n are positive integers. Preferably S is a number selected from the group consisting of 4, 8, and 16, and n is a number selected from the group consisting of 1, 2, 3, 4, and 6. More preferably S=8 and n=2.

In one embodiment, processing the reference frequency signal to produce the secondary digital transceiver clock signal at a frequency of chiprate comprises eliminating pulses from the reference frequency signal. Generally, N–M of every N pulses can be eliminated, wherein N and M are integers, and N≧M. Different numbers of pulses will be eliminated depending on the frequency of the reference frequency source.

In another embodiment, processing the reference frequency signal to produce the secondary digital transceiver clock signal at a frequency of chiprate includes dividing the frequency of the reference frequency signal to produce a fourth altered signal, and eliminating pulses from the third altered signal.

Preferably, the reference frequency signal is produced by a VCTCXO and the external clock signal is from an analog transceiver.

CONCLUSION

Although the invention has been described in the context of a CDMA cellular telecommunications network, the invention is not limited to CDMA systems, and is not limited to cellular system, but rather is applicable to any spread spectrum communications system.

Illustrative embodiments of the invention, including what are presently considered to be the preferred embodiments of the invention, have been described herein. It will be apparent to those skilled in the art that various changes and modifications can be made without departing from the scope of the invention as defined by the appended claims. Consequently, it is not intended that the invention should be limited to only the embodiments discussed above. Rather, the invention should be limited only by the scope of the claims.

What is claimed is:

1. A method for generating a plurality of clock signals from a single reference frequency signal and synchronizing data signals with one of the generated clock signals, comprising:

processing a reference frequency signal to produce a clock signal for use by a transceiver in a spread spectrum communications apparatus;

dividing the clock signal by n to produce a FIFO output clock signal;

clocking the data signals into a FIFO with an external clock signal, the external clock signal being asynchronous with the FIFO output clock signal; and clocking the data signals out of the FIFO with the FIFO output clock signal.

2. The method of claim 1 wherein said external clock signal has a frequency of chiprate(S).

3. The method of claim 1 wherein the data signals clocked out of the FIFO with the FIFO output clock signal are clocked out at a frequency of chiprate(S).

4. The method of claim 1 wherein said FIFO output clock signal has a frequency of chiprate(S).

5. The method of claim 1 wherein processing the reference frequency signal comprises:

eliminating pulses from the reference frequency signal to produce a second altered signal;

multiplying the frequency of the second altered signal by p to produce the clock signal having a frequency of chiprate(S)(n).

6. The method of claim 5 wherein p is an integer selected from the group consisting of 1, 2, 3, 4, 6, and 8.

7. The method of claim 5 wherein p is 2.

8. The method of claim 5 wherein p is 4.

9. The method of claim 1 wherein processing the reference frequency signal comprises multiplying the frequency of the reference frequency signal.

10. The method of claim 1 wherein processing the reference frequency signal comprises:

multiplying the frequency of the reference frequency signal by p to produce a first altered signal; and eliminating pulses from the first altered signal to produce the clock signal having a frequency of chiprate(S)(n).

11. The method of claim 1 wherein processing the reference frequency signal comprises eliminating pulses from the reference signal.

12. The method of claim 11 wherein one out of every 1025 pulses is eliminated from the reference frequency signal.

13. The method of claim 11 further comprising:

multiplying the frequency of the reference frequency signal by g to produce a third altered signal, with g being a number greater than one; and dividing the frequency of the third altered signal by h to produce an additional clock signal, with h being a number greater than one.

14. The method of claim 11 wherein said clock signal has a frequency of chiprate(S)(n) and wherein S is a positive integer and wherein n is a positive integer.

15. The method of claim 14 wherein S is a number selected from the group consisting of 4, 8, and 16, and wherein n is a number selected from the group consisting of 1, 2, 3, 4, and 6.

16. The method of claim 14 wherein S=8 and n=2.

17. The method of claim 14 wherein N−M of every N pulses are eliminated, wherein N and M are integers, and N≧M.

18. The method of claim 1 wherein the reference frequency source is a VCTCXO.

19. The method of claim 18 wherein the output that provides the external clock signal is a clock output of an analog transceiver.

20. The method of claim 19 wherein the output that provides the data signals is a data output of an analog transceiver.

21. The method of claim 17 wherein the reference frequency source is a VCXO.

22. The method of claim 14 wherein one out of every 1025 pulses is eliminated.

23. The method of claim 14 wherein 513 out of every 1025 pulses is eliminated.

24. The method of claim 14 wherein 29 out of every 4125 pulses is eliminated.

25. The method of claim 14 wherein 2077 out of every 4125 pulses is eliminated.

26. The method of claim 14 wherein said FIFO output clock signal has a frequency of chiprate(S).

27. The method of claim 14 wherein the data signals clocked out of the FIFO with the FIFO output clock signal are clocked out at a frequency of chiprate(S).

28. The method of claim 14 wherein said external clock signal has a frequency of chiprate(S).

29. A method for generating a plurality of clock signals from a single reference frequency signal and synchronizing data signals with one of the generated clock signals, comprising:

processing a reference frequency signal to produce a primary digital transceiver clock signal having a frequency of chiprate(S)(n), said chiprate being the rate at which chip are transmitted and received over an RF link;

dividing the primary digital transceiver clock signal by n to produce a FIFO output clock signal having a frequency of chiprate(S);

clocking the data signal into a FIFO with an external clock signal having a frequency of chiprate(S), the external clock signal being asynchronous with the FIFO output clock signal; and clocking the data signal out of the FIFO with the FIFO output clock signal at a frequency of chiprate(S).

30. The method of claim 29 wherein processing the reference frequency signal comprises multiplying the frequency of the reference frequency signal.

31. The method of claim 29 wherein processing the reference frequency signal comprises:

multiplying the frequency of the reference frequency signal by p to produce a first altered signal; and eliminating pulses from the first altered signal to produce the clock signal having a frequency of chiprate(S)(n).

32. The method of claim 29 wherein processing the reference frequency signal comprises:

eliminating pulses from the reference frequency signal to produce a second altered signal;

multiplying the frequency of the second altered signal by p to produce the clock signal having a frequency of chiprate(S)(n).

33. The method of claim 32 wherein p is an integer selected from the group consisting of 1, 2, 3, 4, 6, and 8.

34. The method of claim 32 wherein p is 2.

35. The method of claim 32 wherein p is 4.

36. The method of claim 29 wherein processing the reference frequency signal comprises eliminating pulses from the reference signal.

37. The method of claim 36 wherein one out of every 1025 pulses is eliminated from the reference frequency signal.

38. The method of claim 36 further comprising:

multiplying the frequency of the reference frequency signal by g to produce a third altered signal, with g being a number greater than one; and dividing the frequency of the third altered signal by h to produce an additional clock signal, with h being a number greater than one.

39. The method of claim 36 wherein said clock signal has a frequency of chiprate(S)(n) and wherein S is a positive integer and wherein n is a positive integer.

40. The method of claim 39 wherein N−M of every N pulses are eliminated, wherein N and M are integers, and N≧M.

41. The method of claim 40 wherein 2077 out of every 4125 pulses is eliminated.

42. The method of claim 40 wherein the reference frequency source is a VCTCXO.

43. The method of claim 40 wherein the reference frequency source is a VCXO.

44. The method of claim 39 wherein one out of every 1025 pulses is eliminated.

45. The method of claim 39 wherein 513 out of every 1025 pulses is eliminated.

46. The method of claim 39 wherein 29 out of every 4125 pulses is eliminated.

47. The method of claim 36 wherein S is a number selected from the group consisting of 4, 8, and 16, and wherein n is a number selected from the group consisting of 1, 2, 3, 4, and 6.

48. The method of claim 36 wherein S=8 and n=2.

* * * * *